United States Patent
Sugiyama et al.

(10) Patent No.: US 6,622,590 B2
(45) Date of Patent: Sep. 23, 2003

(54) CORE BAR FOR STEERING WHEELS

(75) Inventors: Toshiyuki Sugiyama, Shizuoka (JP);
Kazuhiro Kaneko, Shizuoka (JP);
Mikio Ochiai, Shizuoka (JP);
Kazuyoshi Nishijima, Shizuoka (JP);
Kevin Dominic Delaney, Co.Laois (IE)

(73) Assignee: Nihon Plast Co., Ltd., Fuji (JP)

( * ) Notice: Subject to any disclaimer, the term of this patent is extended or adjusted under 35 U.S.C. 154(b) by 56 days.

(21) Appl. No.: 09/805,241

(22) Filed: Mar. 14, 2001

(65) Prior Publication Data

US 2001/0025546 A1 Oct. 4, 2001

(30) Foreign Application Priority Data

Mar. 15, 2000 (JP) .................................... 2000-073000
Mar. 15, 2000 (JP) .................................... 2000-073001
Sep. 29, 2000 (JP) .................................... 2000-301026

(51) Int. Cl.[7] .............................. B62D 1/04; B62D 1/10
(52) U.S. Cl. .......................................................... 74/552
(58) Field of Search ........................................... 74/552

(56) References Cited

U.S. PATENT DOCUMENTS

| 1,629,075 A | * | 5/1927 | Geyer .......................... 74/552 |
| 3,800,620 A | | 4/1974 | Barenyl |
| 4,598,002 A | | 7/1986 | Kimura |
| 4,829,848 A | | 5/1989 | Shinto et al. .................. 74/552 |
| 4,879,923 A | | 11/1989 | Nagata ......................... 74/552 |
| 2001/0027697 A1 | * | 10/2001 | Sugiyama et al. ............. 74/552 |
| 2002/0023517 A1 | * | 2/2002 | Ochiai et al. .................. 74/552 |

FOREIGN PATENT DOCUMENTS

| FR | 1481111 | 11/1967 |
| JP | 57-158158 | 9/1982 |
| JP | 60-60065 | 4/1985 |
| JP | 3-268934 | * 11/1991 |
| JP | 6-47382 | 6/1994 |

* cited by examiner

Primary Examiner—Christopher P. Schwartz
(74) Attorney, Agent, or Firm—Foley & Lardner

(57) ABSTRACT

A core bar includes upper and lower half shells, each having a boss portion including a boss-edge coupling part for coupling the shells along the edges, a shaft fixing part placed substantially in the center of the boss portion and mounted to a steering shaft, and a weak part placed between the boss-edge coupling part and the shaft fixing part and wherein the shells face each other without being coupled; and a rim portion including a rim-edge coupling part for coupling the shells along the edges and a rim hollow part defined between the shells. A spoke portion is interposed between the boss and the rim portions, and includes a spoke-edge coupling part for coupling the shells along the edges and a spoke hollow part defined between the shells.

14 Claims, 13 Drawing Sheets

CORE BAR FOR STEERING WHEELS

BACKGROUND OF THE INVENTION

The present invention relates to a core bar for steering wheels.

Typically, the core bar for steering wheels is formed, for example, by bending and welding an iron bar, or by integral casting of a magnesium alloy material, etc. However, the use of an iron material increases a mass of the core bar and makes weight reduction difficult. On the other hand, the use of a lightweight alloy material such as magnesium alloy enables a reduction in weight, but increases the difficulty of reducing manufacturing costs due to expensive material and the need for finish machining.

In light of these problems, JP-A 57-158158 and JP-A 60-60065 propose two half members each produced by press forming steel plate which are butt-welded to form a hollow core bar. The structure having butt-welded half members allows a reduction both in mass, due to use of a relatively thin steel plate, and in complexity of finish machining due to the use of press forming.

Moreover, a steering wheel is arranged at a given angle and opposite to a driver or an occupant, so that part of a rim or a ring grip of the steering wheel is located relatively close to a driver's abdomen during operation. In consideration of possible collision between the driver and the steering wheel at collision of a vehicle, the rim, etc. are formed to deform and to alleviate any impact of the steering wheel on the driver.

In terms of the impact absorbing characteristics, it is desirable that deformation of the steering wheel occurs so that the rim becomes parallel to the driver without significant change in overall shape of the steering wheel.

However, with the hollow core bar produced by butt-welding half members of a press-formed steel plate, the hollow core bar is apt to strongly resist deformation before being crushed, and to undergo significant change in shape due to total crush when subjected to a force in excess of a predetermined limit. Thus, the realization of desired impact absorbing characteristics for the core bar requires adoption of a complicated shape and/or special materials, thus inducing the drawback of increased manufacturing cost.

SUMMARY OF THE INVENTION

It is, therefore, an object of the present invention is to provide a core bar for steering wheels which exhibits excellent impact absorbing characteristics along with reduced weight and manufacturing cost.

The present invention generally provides a core bar for a steering wheel mounted to a steering shaft, comprising: a first half shell; and a second half shell coupled to the first half shell, each half shell comprising: a boss portion coupled to the steering shaft, the boss portion including a boss-edge coupling part for coupling the first and second half shells along edges thereof, a shaft fixing part placed substantially in a center of the boss portion and mounted to the steering shaft, and a zone of reduced mechanical strength, "weak part" or zone of weakness which is defined between the boss-edge coupling part and the shaft fixing part and wherein the first and second half shells face each other without being coupled; a rim portion including a rim-edge coupling part for coupling the first and second half shells along the edges thereof and a rim hollow part defined between the first and second half shells; and a spoke portion interposed between the boss portion and the rim portion, the spoke portion including a spoke-edge coupling part for coupling the first and second half shells along the edges thereof and a spoke hollow part defined between the first and second half shells.

One aspect of the present invention is to provide a core bar for a steering wheel mounted to a steering shaft, comprising: a first half shell; and a second half shell coupled to the first half shell, each half shell comprising a boss portion, a rim portion and a spoke portion, the rim and spoke portions comprising a flange arranged along one of the edges of the first and second half shells, an embracement arranged along another of the edges for holding the flange, and a hollow defined between the first and second half shells, respectively, the spoke portion comprising, in the vicinity of a connection to the rim portion, a part with greater section than that of an adjacent part.

A further aspect of the present invention is to provide a core bar for a steering wheel mounted to a steering shaft, the steering shaft being provided with a fixation part to which a tightening means is tightened in a predetermined axial direction, an engagement part engaging in a direction of rotation, and a tapered part tapering in an opposite axial direction to the predetermined axial direction, the core bar comprising: a boss portion coupled to the steering shaft, the boss portion including a main body comprising a first reception engaged with the fixation part of the steering shaft and a second reception engaged with the engagement part of the steering shaft, and a block comprising a third reception engaged with the tapered part of the steering shaft and pressed in the opposite axial direction and a support pressing the second reception against the engagement part of the steering shaft; a rim portion; and a spoke portion interposed between the boss portion and the rim portion.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
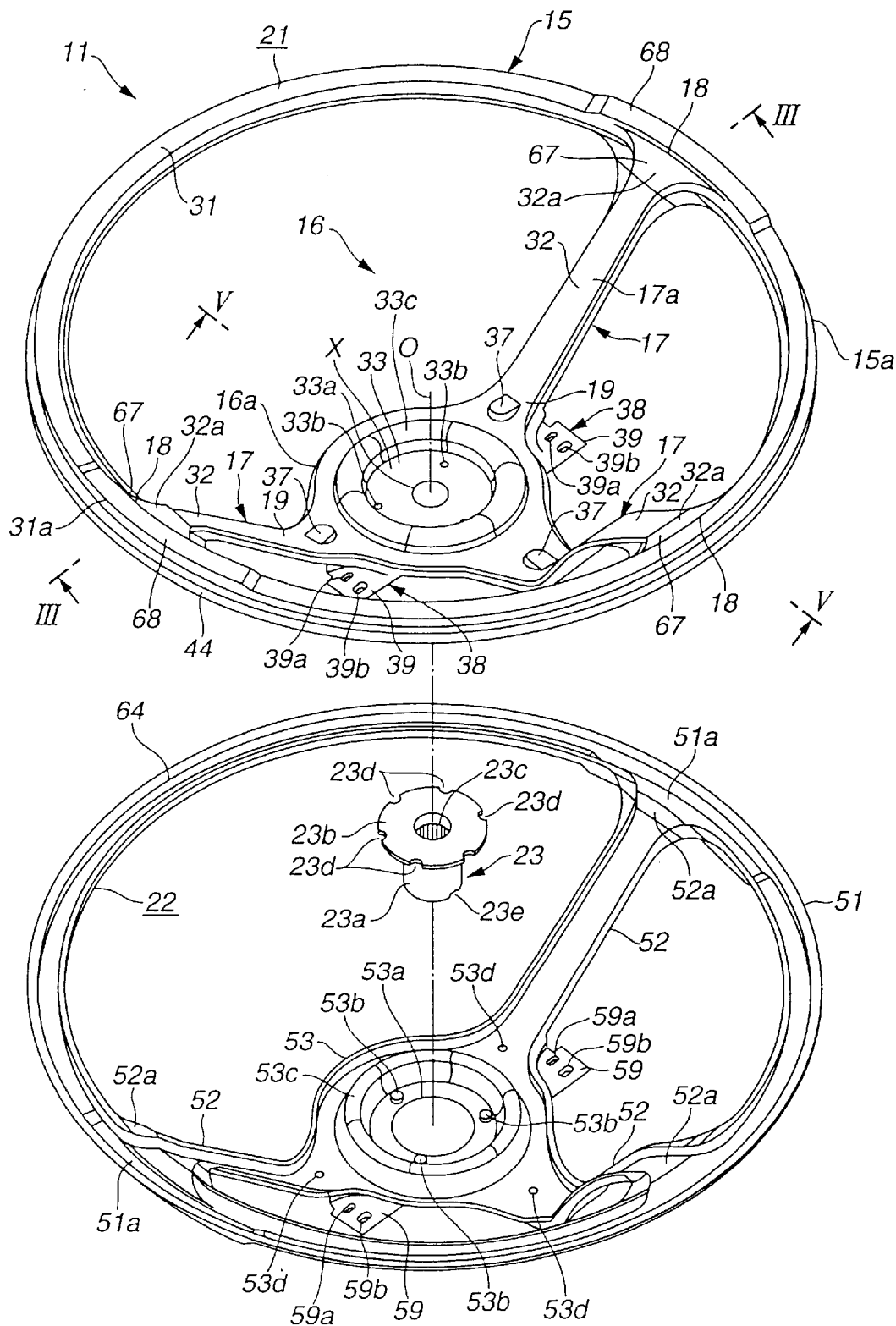
FIG. 1 is an exploded perspective view showing a first embodiment of a core bar for a steering wheel according to the present invention.

Referring to the drawings, preferred embodiments of a core bar for steering wheels are hereinbelow described in detail.

Figure 2:
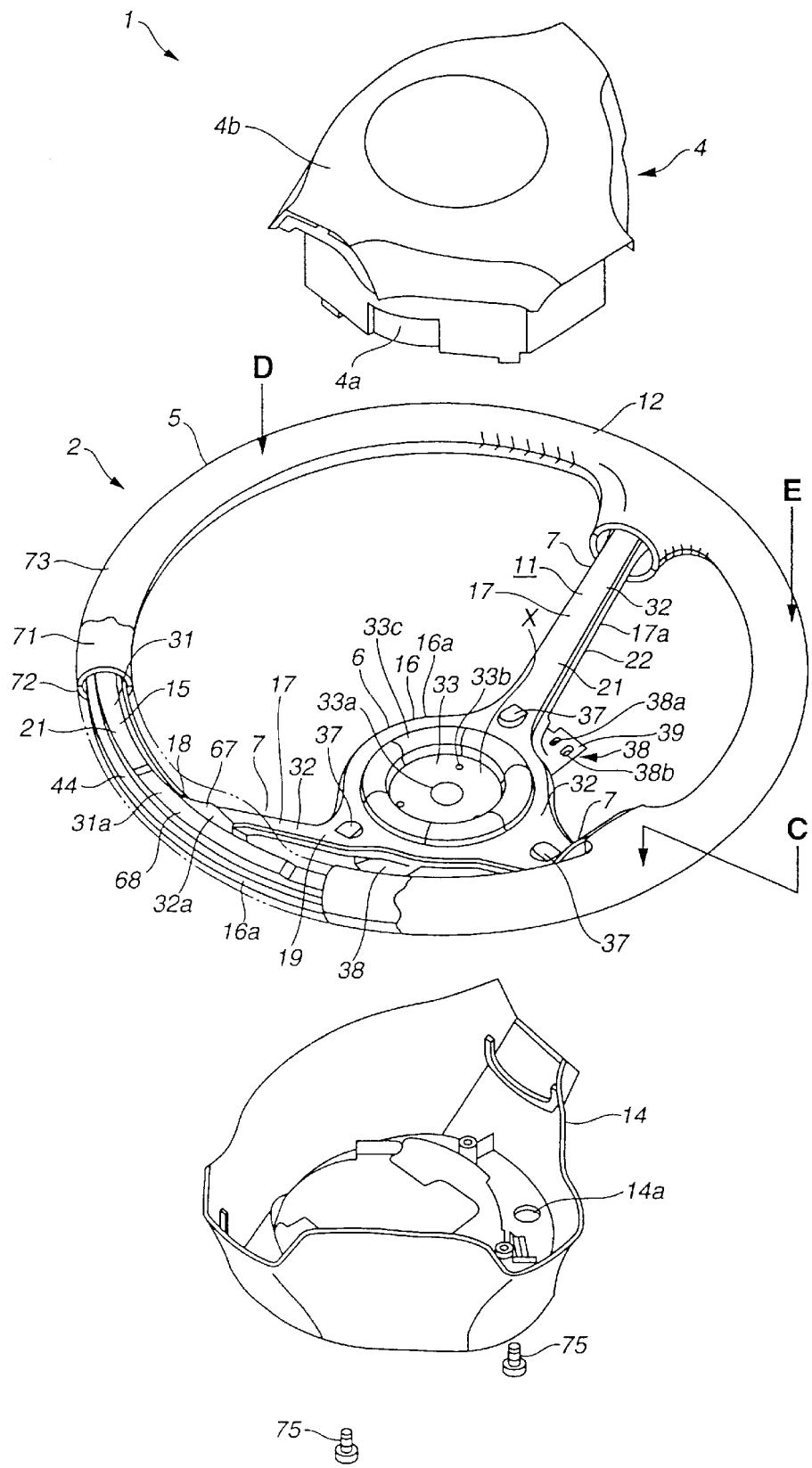
FIG. 2 is a view similar to FIG. 1, partly broken, showing the steering wheel with the core bar.

Referring to FIG. 2, a steering wheel for an automotive vehicle, designated by reference numeral 1, comprises a main body 2, an airbag device or module 4 as a center pad mounted to the main body 2 on the side of a driver or an occupant, etc. The steering wheel 1 is mounted to a steering shaft or a course-guiding shaft arranged on the vehicle-body side. Typically, the steering shaft is disposed in a vehicle with an inclined orientation. In connection with the discussion of this steering wheel 1, reference will hereafter be made to the occupant or airbag-device 4 side or the front side to as upper side, the side opposite to the occupant side, i.e. the vehicle-body or steering-shaft side or the reverse side to as lower side, the vehicular forward or front-glass side to as front side, and the vehicular backward or lower rearward side to as rear side. Refer also an axis of the steering shaft to as an operation axis O.

The steering-wheel main body 2 is substantially annular in shape and comprises a rim 5 also referred to as a grip or ring, a boss 6 placed inside the rim 5, and a plurality of (three in this embodiment) spokes 7 for connecting the rim 5 and the boss 6. The steering-wheel main body 2 also comprises a core bar 11, a sheath 12 for partly covering the core bar 11, and a lower cover 14.

Figure 3:
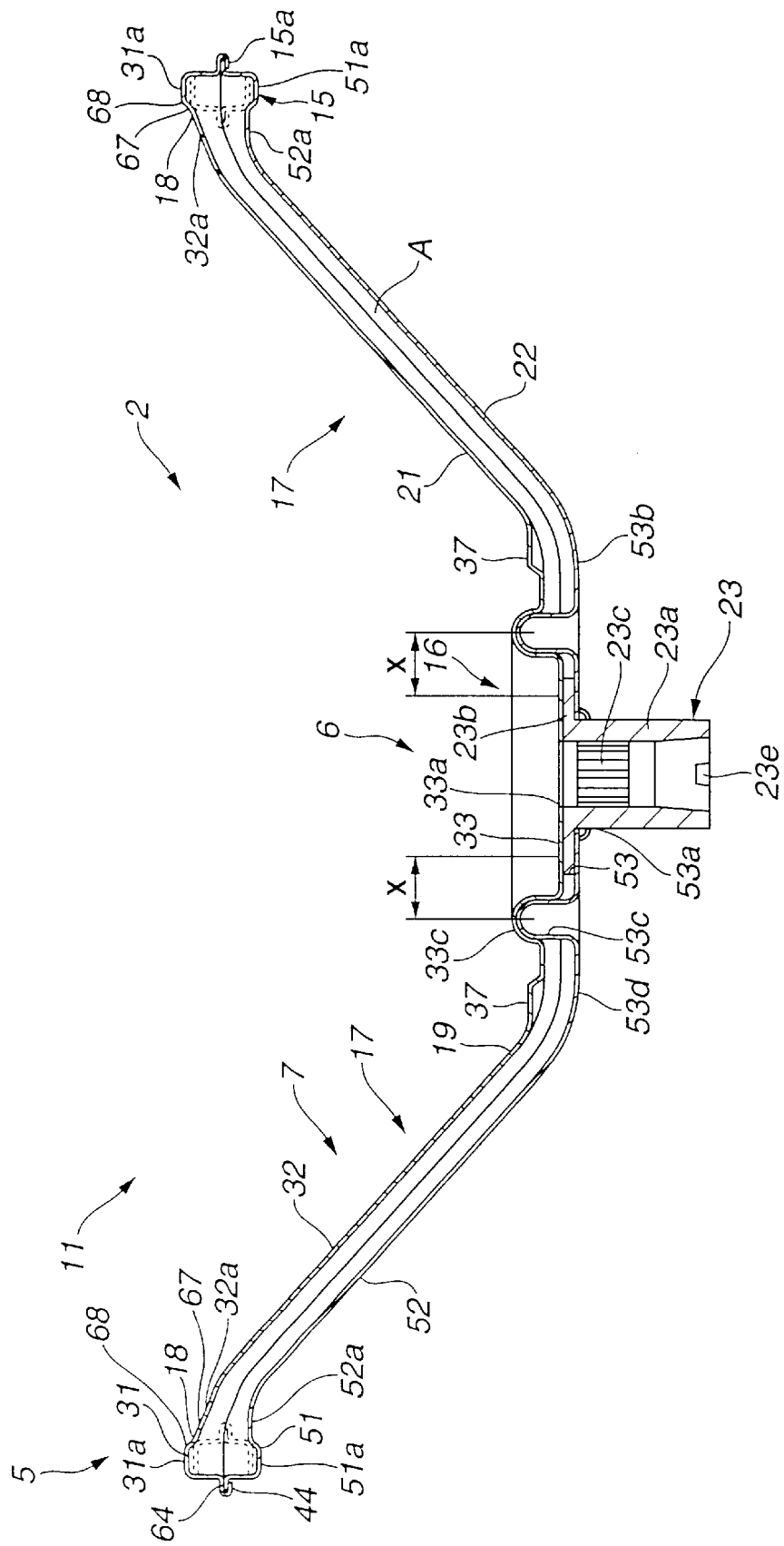
FIG. 3 is a sectional view taken along the line III—III in FIG. 1.

Referring to FIGS. 1–3, the core bar 11 or wheel core bar, is of the shape corresponding to the entire shape of the steering-wheel main body 2, and comprises a rim core-bar portion 15, a boss core-bar portion or a boss plate portion 16 placed inside the rim core-bar portion 15, and a plurality of (three in this embodiment) spoke core-bar portions 17 for connecting the rim core-bar portion 15 and the boss core-bar portion 16. By combining an upper or first-half shell 21 facing the occupant, a lower or second-half shell 22 facing the vehicle body, and a boss body 23 constituting a shaft fixing part, a hollow A is defined by the interiors of the rim core-bar portion 15 and the spoke core-bar portion 17. A connection between the rim core-bar portion 15 and the spoke core-bar portion 17 is hereinafter referred to as an outside connection 18, and a connection between the boss core-bar portion 16 and the spoke core-bar portion 17 is hereinafter referred to as an inside connection 19.

The upper and lower shells 21, 22 are obtained by press forming of a steel plate, each being integrally formed by deep drawing steel plate such as 1.0 mm thick SPCE steel plate. The upper and lower shells 21, 22 are coupled to each other at a rim-edge coupling 15a along the outer and inner peripheries of the rim core-bar portion 15, a spoke-edge coupling 17a along both ends of the spoke core-bar portion 17, and a boss-edge coupling 16a along the outer periphery of the boss core-bar portion 16.

The upper shell 21 includes a rim top 31, spoke tops 32, and a boss top 33. A circular hole 33a is formed in the center of the boss top 33. A plurality of, e.g. three, protrusions 33b is equidistantly formed on the perimeter of a circle with the circular hole 33a as center so as to protrude downwardly. Moreover, a circular protrusion or a reinforcement 33c having substantially U-shaped section is formed at the outer periphery of the circle with respect to the protrusion 33b so as to protrude upwardly. The inner periphery of the protrusion 33c is disposed lower than the outer periphery. Upwardly protruding seats 37 are formed in the vicinity of the respective inside connections 19, i.e. at both sides and the rear of the boss top 33 so as to restrict the height of the airbag device 4.

The spoke tops 32 are extended upwardly inclinedly from both sides and the rear of the boss top 33. Each spoke top 32 has a width which is roughly constant along the longitudinal direction, and includes, in the vicinity of the outside connection 18, an upper spoke core-bar large-diameter portion 32a having a width which is smoothly continuously enlarged toward the outside connection 18. The rim top 31 is annular as viewed in plan, and includes, in the vicinity of the outside connection 18, an upper rim core-bar large-diameter portion 31a having greater height than the other portion. In the vicinity of the inside connections 19 formed at both sides of the boss top 33, brackets 39 are continuously integrated with the boss top 33 and the respective spoke tops 32 to constitute mounting seats 38. Each bracket 39 is shaped like a horizontal plate, and has pluralities of through holes 39a, 39b.

Figure 4A:
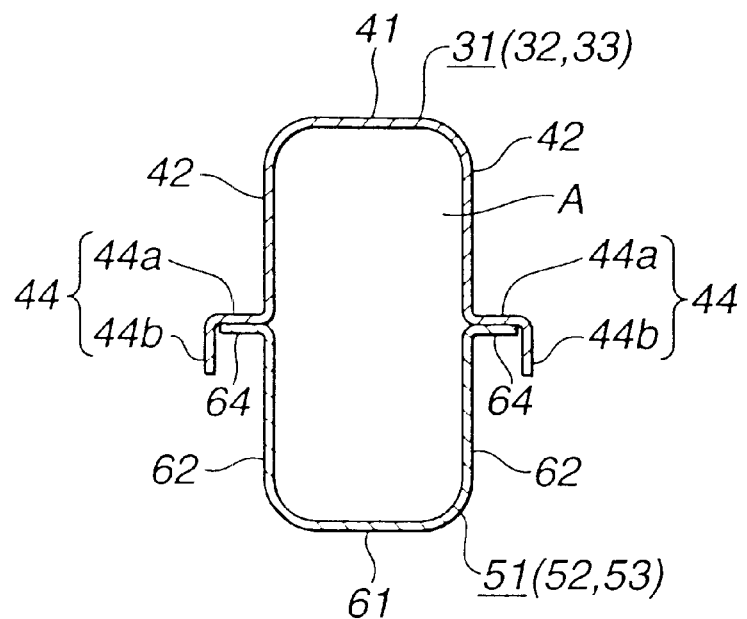
FIGS. 4A–4B are cross sections for explaining the manufacturing process of the core bar.

Referring to FIG. 4A exemplarily illustrating the rim core-bar portion 15, an edge of each of the rim top 31, the spoke tops 32, and the boss top 33 includes a plate-like base 41 and vertical walls 42 extending downwardly from respective edges of the base 41. Continuously formed at a lower end of each vertical wall 42 is a plastically deformable embracement 44 which comprises a horizontal-plate-like upper flange 44a and a fastening 44b extending from an outer edge of the upper flange 44a.

Similar to the upper shell 21, the lower shell 22 includes a rim bottom 51, spoke bottoms 52, and a boss bottom 53. A circular hole 53a, having larger diameter than that of the circular hole 33a of the boss top 33, is formed in the center of the boss bottom 53. A plurality, e.g. three, protrusions 53b is equidistantly formed on the perimeter of a circle with the circular hole 53a as center so as to protrude upwardly. The protrusions 53b are disposed 60° offset with respect to the protrusions 33b of the boss top 33, respectively. Moreover, a circular protrusion or a reinforcement 53c having substantially U-shaped section is formed at the outer periphery of the circle with respect to the protrusion 53b so as to protrude upwardly. For engagement in the protrusion 33c of the boss top 33, the protrusion 53c is of smaller outer diameter and larger inner diameter than those of the protrusion 33c. Mounting holes 53d are formed in the vicinity of the respective inside connections 19, i.e. at both sides and the rear of the boss top 33 so as to correspond to the respective seats 37 of the boss top 33. A self-tapping screw, not shown, is screwed into each mounting hole 53d.

The spoke bottoms 52 extend upwardly at an angle from both sides and the rear of the boss bottom 53. Each spoke bottom 52 has a width which is roughly constant along the longitudinal direction, and includes, in the vicinity of the outside connection 18, a lower spoke core-bar large-diameter portion 52a having a width which smoothly continuously enlarged toward the outside connection 18. The rim bottom 51 is annular as viewed in plan, and includes, in the vicinity of the outside connection 18, a lower rim core-bar large-diameter portion 51a having greater height than the other portion. In the vicinity of the inside connections 19 formed at both sides of the boss top 33, brackets 59 are continuously integrated with the boss bottom 53 and the respective spoke tops 52 to constitute the mounting seats 38. Each bracket 59 is shaped like a flat plate, and has a plurality of through holes 59a, 59b.

Referring to FIG. 4A, an edge of each of the rim bottom 51, the spoke bottom 52, and the boss bottom 53 includes a plate-like base 61 and vertical walls 62 which extend upwardly from respective edges of the base 61. A horizontal-plate-like flange 64 is continuously formed at an upper end of each vertical wall 62. The length between outer ends of the flanges 64, 64 of the lower shell 22 is smaller than that between inner side faces of the fastenings 44b, 44b of the upper shell 21.

As shown in FIGS. 1 and 3, the boss body 23 is formed of an iron material by either forging, casting, or numerically controlled (NC) machining using an NC machine tool. The boss body 23 unitarily comprises an essentially cylindrical-shaped tube 23a and an essentially disc-shaped boss flange 23b. The boss body is formed of S15C-equivalent steel material, for example. Splines or serrations 23c are formed on the inner periphery of the tube 23a to mesh with splines or serrations on the outer periphery of a head of the steering shaft. Six semicircular notches 23d are equidistantly formed at the outer periphery of the boss flange 23b. Moreover, a rectangular cancellation recess 23e is formed at a lower end of the tube 23a to engaged a canceling pin for automatically returning an operation lever of a direction-indicator lamp mounted to a steering column (not shown).

The core bar 11 is constructed by butting the upper and lower shells 21, 22 with the boss body 23 held therebetween. Specifically, in the manufacturing process of the core bar 11, the boss body 23 is disposed between the boss top 33 of the upper shell 21 and the boss bottom 53 of the lower shell 22, and the upper and lower shells 21, 22 are placed one upon another. At this time, the tube 23a of the boss body 23 is protruded downwardly from the circular hole 53a of the boss bottom 53, and the boss flange 23b is held between the boss top 33 and the boss bottom 53. Moreover, the protrusions 33b, 53b are alternately engaged with the six notches 23d of the boss flange 23b from above and below, carrying out positioning of the upper and lower shells 21, 22 and the boss body 23 in the direction of rotation.

Figure 4B:
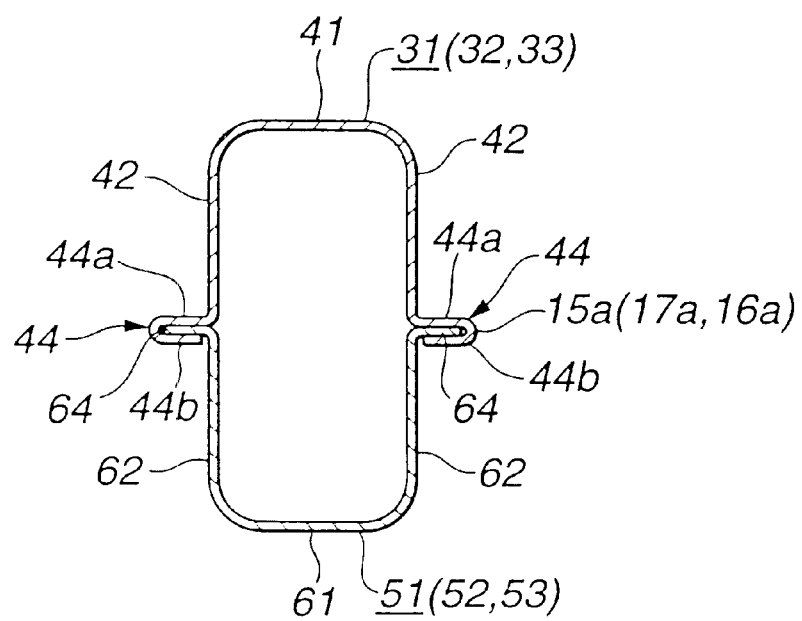

With the upper and lower shells 21, 22 placed one upon another, each flange 64 that is arranged along an edge of the lower shell 22 is received in the embracement 44 arranged along an edge of the upper shell 21. Then, the fastening 44b of the embracement 44 is subjected to hemming, i.e. it is bent by a force given by an automatic machine from the state as shown in FIG. 4A to the state as shown in FIG. 4B wherein the fastening 44b is wound up to the lower face of the flange 64 of the lower shell 22, coupling the upper and lower shells 21, 22. The rim core-bar portion 15 and the spoke core-bar portion 17 form a tube with closed section to define the hollow A therein. With the boss core-bar portion 16, the upper and lower protrusions 33c, 53c are closely engaged and fixed without being joined with each other so as to form a zone of reduced mechanical strength or middle weakness zone "X" which is deformable by an external force and located inside the protrusions 33c, 53c and outside the boss body 23. The section of the weakness zone X is of smaller height and larger width, i.e. smaller in height along the direction of the operation axis O and larger in width in the direction perpendicular to the direction of the operation axis O compared with the section of the hollow A defined by the rim core-bar portion 15 and the spoke core-bar portion 17. The boss body 23 is fixed to the lower shell 22 in predetermined positions by spot welding or the like.

Moreover, a spoke core-bar large-diameter portion 67 is configured in the spoke core-bar portion 17, which is continuously connected to the outside connection 18 to which the rim core-bar portion 15 and the spoke core-bar portion 17 are coupled, and has larger sectional area with larger width. Further, a rim core-bar large-diameter portion 68 is configured in the rim core-bar portion 15, which is continuously connected to the outside connection 18 and has larger sectional area with greater height.

Furthermore, as shown in FIG. 2, the upper and lower brackets 39, 59 are aligned and placed one upon another to obtain the mounting seat 38. The mounting seat 38 is formed with a positioning hole 38a communicating with the through holes 39a, 59a, and a mounting hole 38b communicating with the through holes 39b, 59b.

The sheath 12 and the lower cover 14 are mounted to the core bar 11 so as to obtain the steering-wheel main body 2. The sheath 12 includes upper and lower rim covers 71, 72 which partly envelop the rim core-bar portion 15 and the spoke core-bar portion 17. Moreover, the whole of the rim covers 71, 72 is covered with a skin material 73 of, e.g. natural leather such as cowhide or artificial leather wound and seamed at the outer periphery, as required.

The lower cover 14 is integrally formed, e.g. out of synthetic resin to have the shape allowing partial covering of the boss core-bar portion 16 and the spoke core-bar portion 17. The lower cover 14 is mounted to the lower shell 22 by inserting the self-tapping screws into the respective through holes from below and engaging them with the respective mounting holes 53d of the lower shell 22. Each seat 37 of the upper shell 21 facing the corresponding mounting hole 53d of the lower shell 22 serves to prevent a threaded part of the self-tapping screw from abutting on the upper shell 21 even if the threaded part protrudes upwardly from the mounting hole 53d. Moreover, the lower cover 14 has working through holes 14a facing the mounting seats 38 of the core bar 11.

The airbag device 4 comprises a metal base plate 4a, an un-illustrated bag-like airbag and inflator for supplying gas thereto, mounted to the base plate 4a, and a cover 4b concealing the airbag and capable of being broken by the pressure provided when the airbag develops. The base plate 4a includes a pair of nut portions having downward tapped hole, and positioning protrusions placed in the proximity of the nut portions. The airbag device 4, which is placed on the boss core-bar portion 16 of the core bar 11, abuts on the seats 37 of the upper shell 21 for positioning in the height direction, and has positioning protrusions inserted in the respective positioning holes 38a of the mounting seats 38 for positioning in the horizontal or cross direction. With the upper and lower through holes 39a, 59a constituting the positioning hole 38a, the through hole 59a of the lower shell 22 is larger than the through hole 39a of the upper shell 21 to prevent the lower shell 22 from contacting and interfering with the positioning protrusion inserted in the through hole 39a. By engaging bolts 75 inserted from below through the working through holes 14a with the respective nut portions of the base plate 4a through the mounting holes 38b of the mounting seats 38, the airbag device 4 is fixed to the steering-wheel main body 2 to obtain the steering wheel 1.

Next, operation of the first embodiment is described. In the event of vehicular collision, the airbag device 4 is operated to develop the airbag in front of the driver or occupant so as to restrain him or her thrown forward, alleviating a collision impact to be applied.

Figure 5:
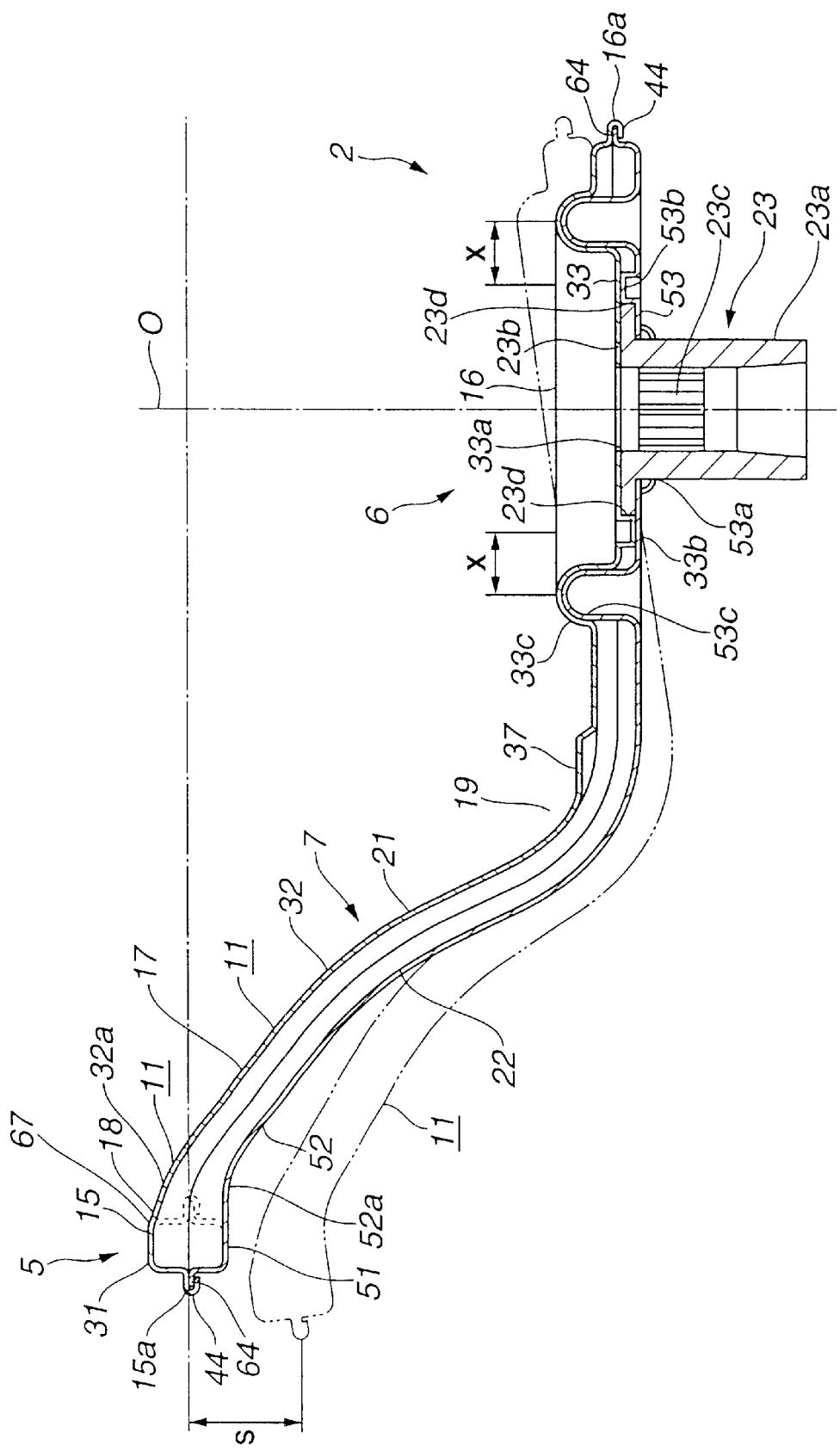
FIG. 5 is a view similar to FIG. 3, taken along the line V—V in FIG. 1.

Referring to FIG. 5, in the event that the occupant collides with the steering wheel 1 regardless of actuation of the airbag device 4, the core bar 11 can be deformed or self-aligned as illustrated by the two-dot chain line, absorbing a collision impact. At this time, the core bar 11 provides a greater strength, since the outer periphery of the boss core-bar portion 16 is reinforced by the protrusions 33c, 53c, the rim core-bar portion 15 and the spoke core-bar portion 17 continuously connecting the protrusions 33c, 53c form a tube with closed section, and the embracement coupling structure provides a rib structure. Moreover, the spoke core-bar large-diameter portion 67 and rim core-bar large-diameter portion 68 having increased sectional area are formed at the outside connection 18 to which the rim core-bar portion 15 and the spoke core-bar portion 17 are coupled, and the spoke core-bar large-diameter portion 67 is shaped like a soft sector to increase the sectional area, allowing restrained concentration of a stress on the outside connection 18. This results in excellent shape conservation-ability of the steeringwheel main body 2 in its entirety. Then, an outer peripheral edge of the boss flange 23b of the boss body 23 of the boss core-bar portion 16 functions as the weakness zone X, which is deformed intensively to change the angle at the base, as it were, of the spoke core-bar portion 17 with the entire shape conserved with respect to an external force, absorbing a collision impact.

Figure 6:
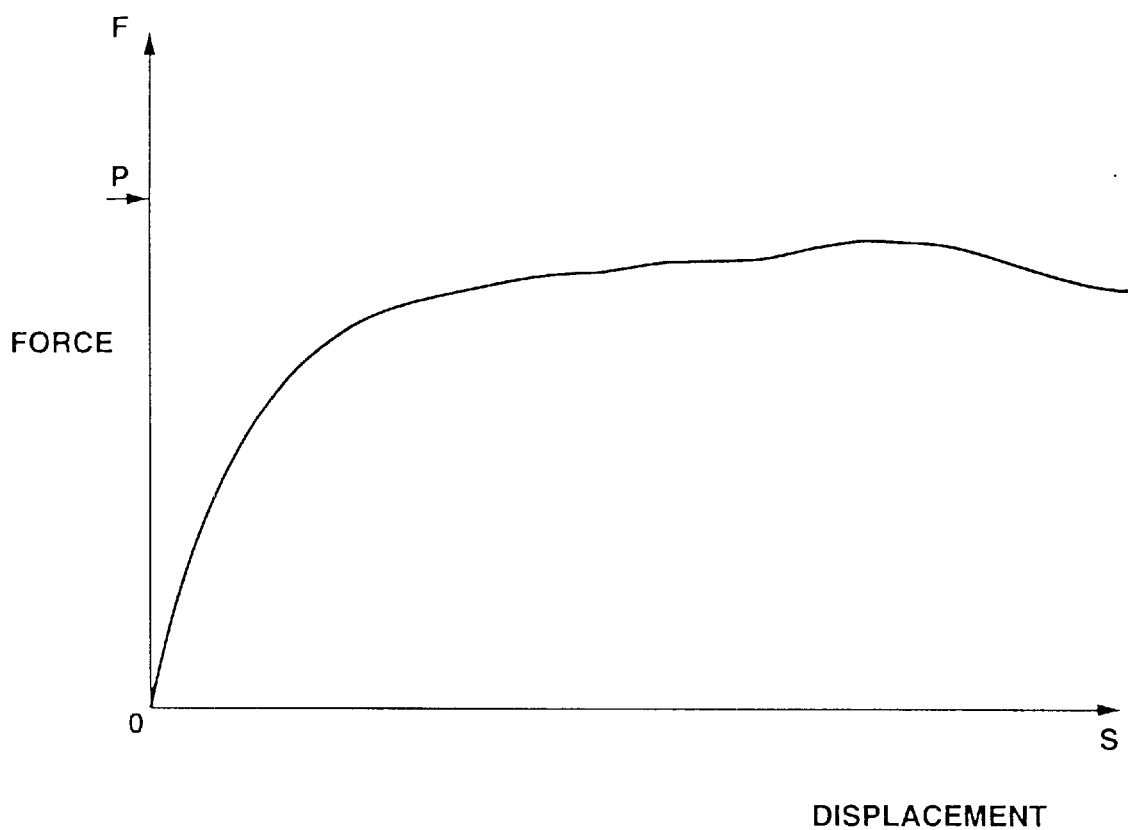
FIG. 6 is a graphical representation illustrating the impact absorbing characteristics for the core bar.

FIG. 6 is a graphical representation illustrating the load-stroke (F-S) characteristics when depressing a C or zero point as shown in FIG. 2 at a depressing speed of 50 mm/min. Referring to FIG. 6, a point P on the vertical axis is 1.7 kN, and a deformation distance or a stroke S as shown in FIG. 5 is up to about 70 mm. This graphical representation reveals that the core bar 11 could provide excellent impact absorbing characteristics similar to those for the core bar of magnesium alloy with gentle rise of a curve and peak load below 1.7 kN. Likewise, for load application on a D or 180° point or an E or 45° point as shown in FIG. 2, the core bar 11 was not deformed in its entirety with the angle being changed at the boss core-bar portion 16. Even if a collision occurs with any steering angle at the steering wheel 1, the steering-wheel main body 2 was deformed at the boss 6 to change the angle thereat.

In such a way, in the first embodiment, the core bar 11 is excellent in shape conservation-ability with deformation produced at only particular spots with respect to an external force. Specifically, while the rim core-bar portion 15 and the spoke core-bar portion 17 preserve respective given shapes, the weakness zone X of the boss core-bar portion 16 is solely deformed to change the angle at the core bar 11 with the entire shape thereof conserved. As a result, a reaction force for an external force can readily be controlled at a desired value, achieving excellent self-aligning characteristics, i.e. impact absorbing characteristics for the core bar 11.

Moreover, the core bar 11 is hollow in its entirety, allowing readily and significantly reduced mass or weight. By way of example, the core bar 11 has about ⅓ mass with respect to a conventional equivalent obtained by bending and welding an iron bar material. This mass corresponds to about 1.4 times as greater as that of an equivalent of magnesium alloy.

Furthermore, the core bar 11 is obtained through embracement coupling wherein the upper and lower shells 21, 22 are coupled face-to-face by hemming, allowing not only mechanically strong coupling, i.e. improved strength, but easy formation of the hollow A with enhanced strength which contributes to a reduction in manufacturing cost. Moreover, the core bar 11 can be machined at ordinary temperature without involving temperature variations and local heating during the machining process, having no dimensional variations, nor accuracy lowering, and no microstructural variations of a material, resulting in easy accurate machining with full use of the material characteristics.

Further, the section of the weakness zone X of the boss core-bar portion 16 is of smaller height and larger width, i.e., smaller in height along the direction of the operation axis O and larger in width in the direction perpendicular to the direction of the operation axis O compared with the section of the hollow A defined by the rim core-bar portion 15 and the spoke core-bar portion 17. Then, the boss core-bar portion 16 is flat and large in width, allowing easy configuration of the weakness zone X for an external force along the direction of the operation axis O. On the other hand, the spoke 7 and the rim 5 are of larger height and smaller width along the operation axis O, allowing easy enhancement of the strength for an external force along the direction of the operation axis O. This enables conservation of the steering-wheel main body 2 in a given shape, resulting in excellent holding feel thereof and excellent visibility of meters arranged on an instrument panel of the vehicle body.

Still further, the boss body 23, a component different from the upper and lower shells 21, 22, is disposed in the center of the boss core-bar portion 16 and between the upper and lower shells 21, 22, and is fixedly mounted to one of the shells 21, 22. This structure allows readily secured high strength in a part of the boss core-bar portion 16 to be mounted to the steering shaft, resulting in excellent mountability to the vehicle body. Moreover, this structure allows deformation of the boss core-bar portion 16 to occur at an outer edge of the boss body 23, readily securing desirable impact absorbing characteristics.

Furthermore, at least one of the upper and lower shells 21, 22 constituting the boss core-bar portion 16 is provided with the protrusion 33c, 53c as a circular protuberant reinforcement distant from and formed along the outer periphery of the boss core-bar portion 16 so as to place the weakness zone X inside the protrusions 33c, 53c. As a result, the outer periphery of the boss core-bar portion 16 and the rim core-bar portion 15 provide the strength as if they are integrated with the spoke core-bar portion 17, achieving high shape conservation-ability with respect to an external force and desirable impact absorbing characteristics through deformation produced inside the protrusions 33c, 53c. Moreover, though the reinforcements 33c, 53c enhance the strength, they do not couple and restrain the upper and lower shells 21, 22, facilitating occurrence of deformation at the weakness zone X placed inside the protrusions 33c, 53c, resulting in both excellent shape conservation-ability and excellent impact absorbing characteristics.

In the first embodiment, the embracement 44 is included with the upper shell 21, whereas the flange 64 is included with the lower shell 22. Optionally, the embracement 44 may be included with the lower shell 22, whereas the flange 64 may be included with the upper shell 21.

Moreover, the steering wheel 1 can be constructed otherwise. By way of example, the number of spokes 7 or spoke core-bar portions 17 may be one, two, and four or more in place of three. Furthermore, without using a preformed member, the sheath 12 for covering the core bar 11 may be a member obtained by insert molding by injecting resin into a mold with the core bar 11 disposed therein.

Furthermore, the boss body 23 can be fixed to both of the upper and lower shells 21, 22 instead of being fixed to one of them.

Figure 7:
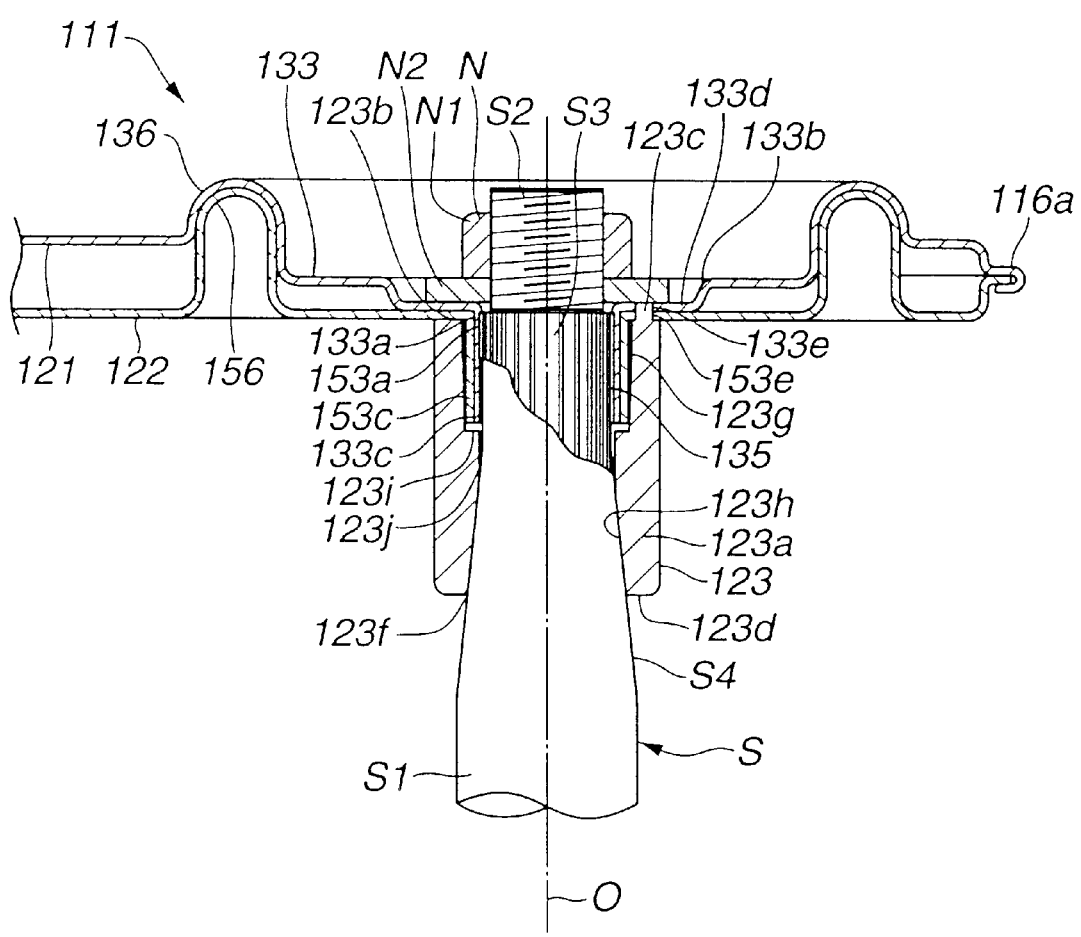
FIG. 7 is a view similar to FIG. 5, taken along the line VII—VII in FIG. 8 and showing a second embodiment of the present invention.
Figure 8:
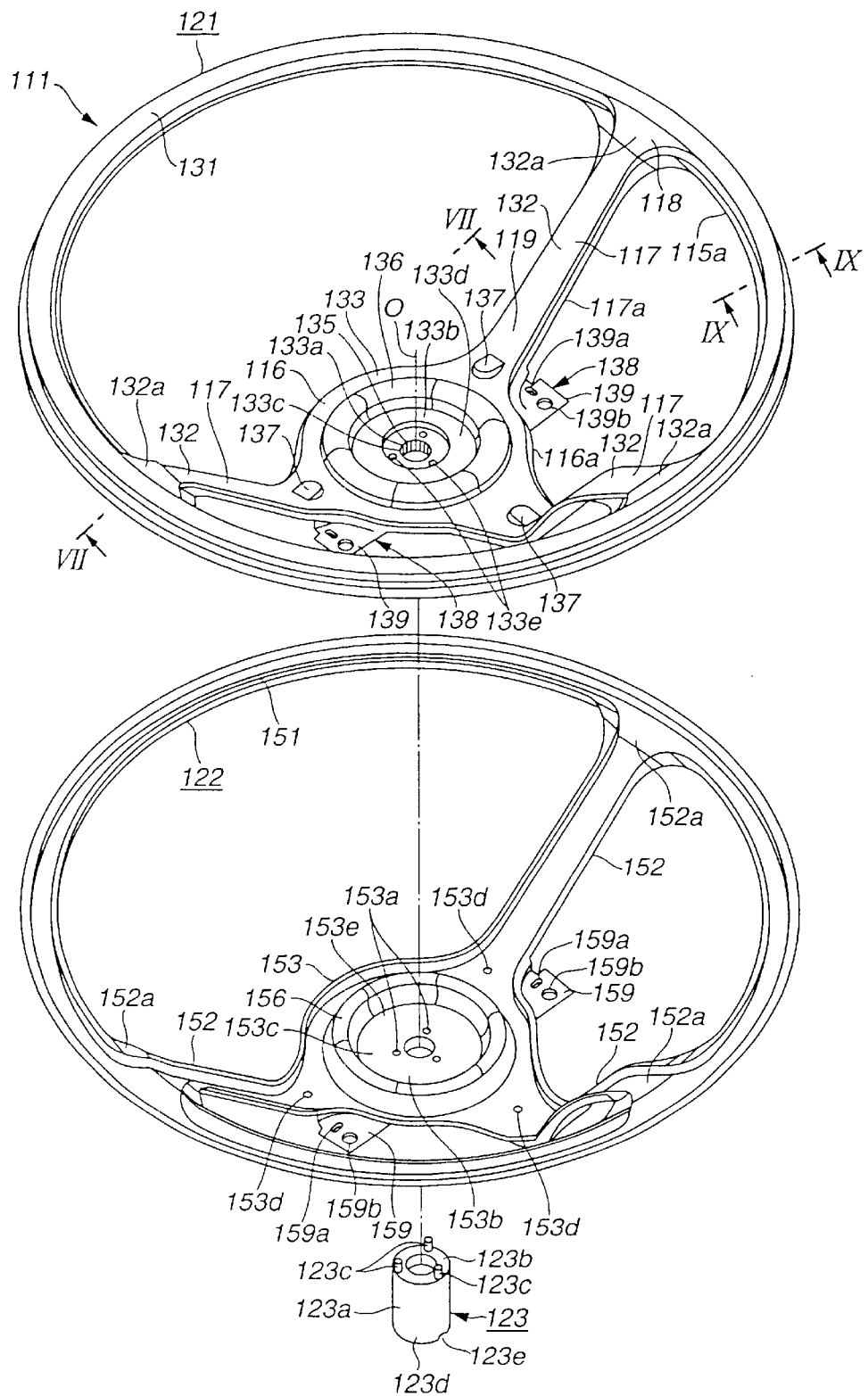
FIG. 8 is a view similar to FIG. 1, showing the core bar in the second embodiment.

Referring to FIGS. 7–8 illustrating a second embodiment of the present invention, the steering wheel is of substantially the same structure as that in the first embodiment. Refer hereafter an axis of a steering shaft S to as a rotation axis O, and the downward direction along the rotation axis O to as tightening direction.

As shown in FIG. 7, the steering shaft S includes a cylindrical shank S1, a tightening fixation or a threaded portion S2 formed at a head of the shank S1, a rotation engagement or a serration S3 arranged between the shank S1 and the tightening fixation S2, and a taper S4 tapering from the shank S1 to the rotation engagement S3. A tightening means or a nut N is meshed with the tightening fixation S2. The tightening means N includes a flanged nut having a main body N1 and a flange N2 integrated therewith, the diameter of the flange N2 being larger than that of the main body N1. Optionally, the flange N2 can be in the form of a different and separate ring.

The steering-wheel main body is substantially annular in entire shape, for example, and comprises a rim called also grip or ring for holding operation, a boss placed inside the rim, and a plurality of (three in this embodiment) spokes for connecting the rim and the boss. The steering-wheel main body also comprises a core bar 111, a sheath for partly covering the core bar 111, and a lower cover.

Referring to FIG. 8, the core bar 111, which can be called wheel core bar, is of the shape corresponding to the entire shape of the steering-wheel main body, and comprises a rim core-bar portion 115, a boss core-bar portion or a boss plate portion 116 placed inside the rim core-bar portion 115, and a plurality of (three in this embodiment) spoke core-bar portions 117 for connecting the rim core-bar portion 115 and the boss core-bar portion 116. The core bar 111 is of the hollow structure by combining an upper or first-half shell 121 facing the occupant and a lower or second-half shell 122 facing the vehicle body. The core bar 111 also comprises a boss body or a block 123 fixed to the upper and lower shells 121, 122. By filling the hollow defined between the rim core-bar portion 115 and the spoke core-bar portion 117 with a resin filling material, a reinforcement can be arranged in the hollow as required. Refer hereafter a connection between the rim core-bar portion 115 and the spoke core-bar portion 117 to as an outside connection, and a connection between the boss core-bar portion 116 and the spoke core-bar portion 117 to as an inside connection.

The upper and lower shells 121, 122 are obtained by press forming of a steel or metal plate, each being integrally formed by, e.g. a 1.0 mm thickness SPCD steel plate as press formed. The upper and lower shells 121, 122 are coupled to each other by hemming and partly welding at a rim-edge coupling 115a along the outer and inner peripheries of the rim core-bar portion 115, a spoke-edge coupling 117a along both ends of the spoke core-bar portion 117, and a boss-edge coupling 116a along the outer periphery of the boss core-bar portion 116.

The upper shell 121 includes a rim top 131, spoke tops 132, and a boss top 133. A circular hole 133a is formed in the center of the boss top 133, and a circular base 133b is arranged about the circular hole 133a. A tube 133c constituting an integral boss is integrated with the base 133b along the circular hole 133a to protrude downwardly. The top face of the base 133b serves as a tightening reception 133d. One or a plurality of, e.g. three, positioning through holes or portions 133e is equidistantly formed on the perimeter of a circle with the circular hole 133a as center. Moreover, a rotation reception 135 is arranged in the inner peripheral face of the tube 133c, and includes a serration having a plurality of vertically extending protrusions and recesses with roughly triangular section arranged in parallel. A junction or a circular protuberance 136 having substantially U-shaped section is formed with the boss top 133 about the circular hole 133a to protrude upwardly and surround distantly the outer periphery of the structures such as the base 133b. The inner periphery of the junction 136 is disposed lower than the outer periphery, and the base 133b is disposed at a further lower level. Upwardly protruding seats 137 are formed at both sides and the rear of the boss top 133 so as to receive the base of the airbag device for height restriction thereof.

The spoke tops 132 are extended upwardly inclinedly from both sides and the rear of the boss top 133. Each spoke top 132 is of the width roughly constant along the longitudinal direction, and includes, in the vicinity of the outside connection 118, an upper spoke core-bar large-diameter portion 132a having width smoothly continuously enlarged toward the outside connection 118. The rim top 131 is of the annular shape as viewed in plan, and can include, in the vicinity of the outside connection 118, an upper rim core-bar large-diameter portion having greater height than the other portion, as required. In the vicinity of the inside connections 119 formed at both sides of the boss top 133, brackets 139 are continuously integrated with the boss top 133 and the respective spoke tops 132 to constitute mounting seats 138 to which the base of the airbag device is screwed. Each bracket 139 is shaped like a horizontal plate, and has pluralities of through holes or positioning holes 139a and through holes or tapped holes 139b.

Figure 9A:
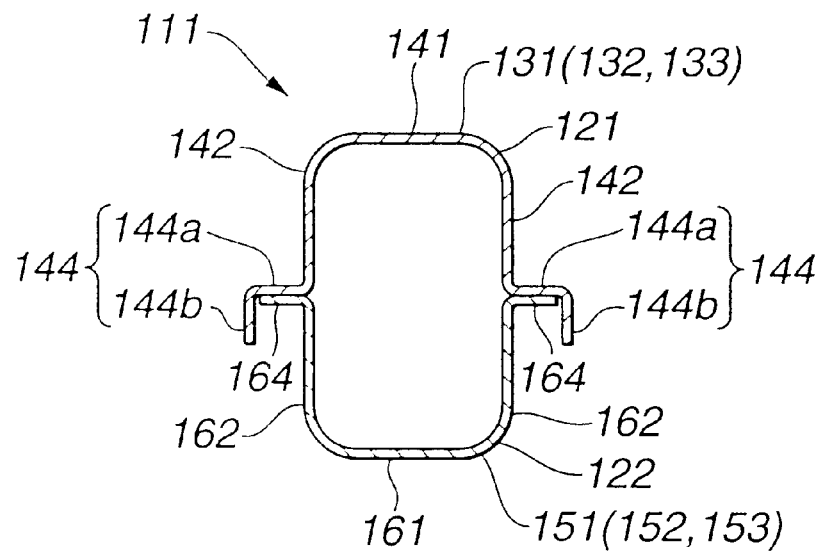
FIGS. 9A–9B are views similar to FIGS. 4A–4B, taken along the line IX—IX in FIG. 8 and for explaining the manufacturing process of the core bar.

Referring to FIG. 9A exemplarily illustrating the rim core-bar portion 115, an edge of each of the rim top 131, the spoke tops 132, and the boss top 133 includes a plate-like base 141 and vertical walls 142 extending downwardly from respective edges of the base 141. Continuously formed at a lower end of each vertical wall 142 is a plastically deformable embracement 144 which comprises a horizontal-plate-like upper flange 144a and a fastening 144b extending from an outer edge of the upper flange 144a.

Referring to FIGS. 7–8, in the similar way to the upper shell 121, the lower shell 122 includes a rim bottom 151, spoke bottoms 152, and a boss bottom 153. A circular hole 153a is formed in the center of the boss bottom 153 to receive the tube 133c of the upper shell 121, and a tube 153c constituting an integral boss is integrated with the boss bottom 153 along the circular hole 153a to protrude downwardly. A plurality of positioning through holes 153e is formed about the circular hole 153a to correspond to the positioning through holes 133e of the upper shell 121. Moreover, the lower shell 122 includes a junction or a circular protuberance 156 with substantially U-shaped section formed about the circular hole 153a so as to protrude upwardly. The junction 156 is engaged or received inside the junction 136 of the upper shell 121. Small-diameter cylindrical mounting holes 153d are formed in the vicinity of the respective inside connections 119, i.e. at both sides and the rear of the boss top 133 so as to correspond to the respective seats 137 of the boss top 133. A self-tapping screw, not shown, is meshed with each mounting hole 153d.

The mounting holes 153d can be used as an inlet for introducing a filling material such as polyurethane foam into the hollow inside an outer shell.

The spoke bottoms 152 are extended upwardly inclinedly from both sides and the rear of the boss bottom 153. Each spoke bottom 152 is of the width roughly constant along the longitudinal direction, and includes, in the vicinity of the outside connection 118, a lower spoke core-bar large-diameter portion 152a having width smoothly continuously enlarged toward the outside connection 118. The rim bottom 151 is of the annular shape as viewed in plan, and can include, in the vicinity of the outside connection 18, a lower rim core-bar large-diameter portion having greater height than the other portion, as required. In the vicinity of the inside connections 119 formed at both sides of the boss top 133, brackets 159 are continuously integrated with the boss bottom 153 and the respective spoke tops 152 to constitute the mounting seats 138. Each bracket 159 is shaped like a horizontal plate, and has pluralities of through holes 159a, 159b.

Referring to FIG. 9A, an edge of each of the rim bottom 151, the spoke bottom 152, and the boss bottom 153 includes a plate-like base 161 and vertical walls 162 extending upwardly from respective edges of the base 161. A horizontal-plate-like flange 164 is continuously formed at an upper end of each vertical wall 162. The length between outer ends of the flanges 164, 164 of the lower shell 122 is smaller than that between inner side faces of the fastenings 144b, 144b of the upper shell 121.

As shown in FIG. 8, the boss body 123 is formed by applying an iron material to forging, casting, or numerically controlled (NC) machining using an NC machine tool. In this embodiment, the boss body 123 includes a single piece obtained by forging a steel material, for example. Specifically, the boss body 123 comprises a substantially cylindrical main body 123a having a top face 123b on which three pins or positioning parts 123c equidistantly are arranged to protrude upwardly, and a bottom face 123d with which a recess or rectangular concavity 123e is formed as a canceling means. The recess 123e is engaged with a canceling pin for automatically returning an operation lever for a direction-indicator lamp mounted to a steering column, not shown. Moreover, as show in FIG. 7, the boss body 123 is formed with a through hole 123f vertically extending therein and having at an upper part a rotation support or a first inclination 123g with an upwardly increasing inclined face and at a lower part or below the rotation support 123g a tapered reception or a second inclination 123h with a downwardly increasing inclined face. Arranged between the rotation support 123g and the tapered reception 123h are a step 123i extending to the rotation support 123g, and a straight 123j continuously connected to the tapered reception 123h at the step 123i and having constant diameter.

The core bar 111 is constructed by butting and coupling the upper and lower shells 121, 122 by hemming, obtaining a boss core-bar main body. And the boss body 123 is mounted to the lower side of the lower shell 122 of the boss core-bar main body. The sheath and the lower cover are mounted to the core bar 111 so as to obtain the steering-wheel main body.

Figure 9B:
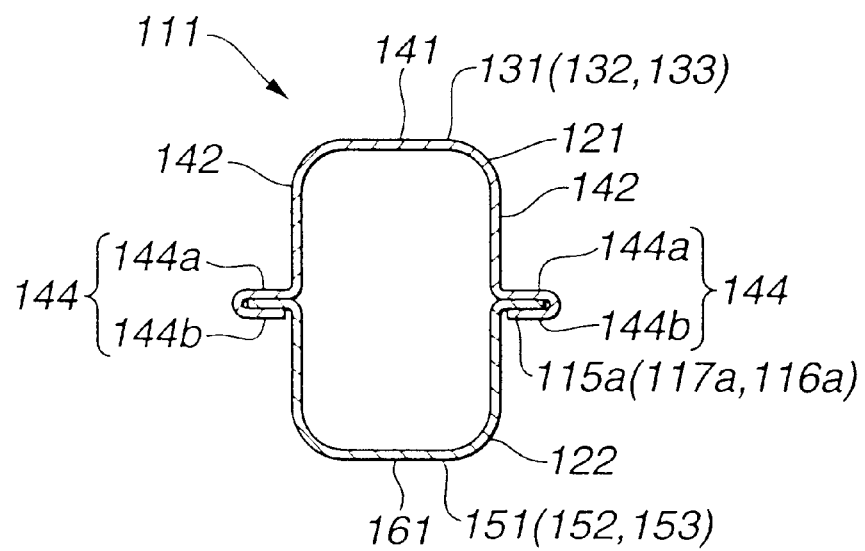

In the manufacturing process of the core bar 111, with the upper and lower shells 121, 122 placed one upon another, each flange 164 arranged along an edge of the lower shell 122 is received in the embracement 144 arranged along an edge of the upper shell 121 as shown in FIG. 9A. Then, the fastening 144b of the embracement 144 is subjected to hemming to couple the upper and lower shells 121, 122. Specifically, by hemming using an automatic machine, the fastening or vertical wall 144b is inclined inwardly, then bent and deformed by applying a force thereto up to the lower face of the flange 164 of the lower shell 122 so as to envelop the flange 164 as shown in FIG. 9B, coupling the upper and lower shells 121, 122. The rim core-bar portion 115 and the spoke core-bar portion 117 form a tube with closed section to define the hollow therein. For circumferential detent for upper and lower shells 121, 122, the rim core-bar coupling 115a of the rim corebar portion 115 can be formed with concavities or engagements obtained by punching at predetermined intervals.

With the boss core-bar portion 116, the upper and lower junctions 136, 156 are closely engaged to receive one in another, and are fixed without being joined with each other so as to form a middle weakness (viz., weakness zone) which is deformable by an external force and placed inside the junctions 136, 156 and outside the boss body 123. The section or zone of the weakness is of smaller height and larger width, i.e. smaller in height along the direction of the rotation axis O and larger in width in the direction perpendicular to the direction of the rotation axis O compared with the section of the hollow defined by the rim core-bar portion 115 and the spoke core-bar portion 117. Moreover, a spoke core-bar large-diameter portion is configured in the spoke core-bar portion 117, which is continuously connected to the outside connection 18 to which the rim core-bar portion 115 and the spoke core-bar portion 117 are coupled, and has larger sectional area with larger width. And a rim core-bar large-diameter portion is configured in the rim core-bar portion 115 as required, which is continuously connected to the outside connection 118 and has larger sectional area with greater height. Furthermore, the upper and lower brackets 139, 159 are aligned and placed one upon another to obtain the mounting seat 138. The mounting seat 138 is formed with a positioning hole communicating with the through holes 139a, 159a, and a mounting hole communicating with the through holes 139b, 159b. A screw is arranged through the mounting hole from below for fixing of the base of the airbag device.

The boss body 123 is engaged by press fitting the rotation support 123g outside the tube 153c, and is positioned by inserting the pins 123c into the respective positioning through holes 133e, 153e of the upper and lower shells 121, 122.

When mounting the core bar 111 to the steering shaft S, the steering shaft S is inserted into the through hole 123f of the boss body 123 from below, i.e. from the tapered reception 123h, so as to engage the rotation reception 135 with the rotation engagement S3, i.e. mesh the serrations together, carrying out relative positioning in the direction of rotation. Moreover, the tightening means or flanged nut N is screwed to the tightening fixation S2 of the steering shaft S protruding from the base 133b of the upper shell 121 through the hole 133a, making the flange N2 press the tightening reception 133d or the top face of the upper shell 121. Then, the upper and lower shells 121, 122 are held between the flange N2 of the tightening means N and the boss body 123 supported by the tapered reception 123h of the steering shaft S. Moreover, when tightening the tightening means N, the rotation support 123g of the boss body 123 presses the tubes 133c, 153c of the upper and lower shells 121, 122 against the inner peripheries thereof, i.e. pushes the rotation reception 135 of the core bar 111 on the rotation engagement S3 of the steering shaft S, to mesh the serrations together for firm coupling, obtaining detent for the rotation reception 135. Also, the tapered reception 123h of the boss body 123 comes in close contact with the taper S4 of the steering shaft S, obtaining firm coupling thereof by a frictional force.

The sheath includes upper and lower rim covers which partly envelop the rim core-bar portion 115 and the spoke core-bar portion 117. The rim covers are formed by injection molding of polypropylene resin, for example. Moreover, the whole of the rim covers can be covered with a skin material of, e.g. natural leather such as cowhide or artificial leather wound and seamed at the outer periphery, as required. The lower cover is integrally formed, e.g. out of synthetic resin to have the shape allowing partial covering of the boss core-bar portion 116 and the spoke core-bar portion 117. The lower cover is mounted to the lower shell 122 by inserting the self-tapping screws into the respective through holes from below and engaging them with the respective mounting holes 153d of the lower shell 122. Each seat 137 of the upper shell 121 facing the corresponding mounting hole 153d of the lower shell 122 serves to prevent a threaded portion of the self-tapping screw from abutting on the upper shell 121 even if the threaded portion protrudes upwardly from the mounting hole 153d.

The airbag device comprises a metal base plate, an un-illustrated bag-like airbag and inflator for supplying gas thereto, mounted to the base plate, and a cover concealing the airbag and capable of being broken by the pressure provided when the airbag develops. The base plate includes a pair of nut portions having downward tapped hole, and positioning protrusions placed in the proximity of the nut portions. The airbag device, which is placed on the boss core-bar portion 116 of the core bar 111, has base plate abutting on the seats 137 of the upper shell 121 for positioning in the height direction, and positioning protrusions inserted in the respective positioning holes 138a of the mounting seats 138 for positioning in the horizontal or cross direction. With the upper and lower through holes 139a, 159a constituting the positioning hole 138a, the through hole 159a of the lower shell 122 is larger than the through hole 139a of the upper shell 121 to prevent the lower shell 122 from contacting and interfering with the positioning protrusion inserted in the through hole 139a. By engaging bolts inserted from below through the working through holes with the respective nut portions of the base plate through the mounting holes 138b of the mounting seats 138, the airbag device is fixed to the steering-wheel main body.

In the second embodiment, the boss core-bar main body including the press-formed upper and lower shells 121, 122 is configured separately from the boss body 123. The rotation reception 135 is formed with the boss core-bar main body, whereas the tapered reception 123h is formed with the boss body 123. This structure allows secure mounting of the core bar 111 to the steering shaft S without backlash only by tightly engaging the tightening means N with the steering shaft S.

Specifically, an integral boss portion, as it were, including the rotation reception 135 integrated with the boss core-bar main body with combined upper lower shells 121, 122 is constructed by engaging the tubes 133c, 153c, which is high in strength per se due to its double structure. Moreover, the inclined face of the rotation support 123g of the boss body 123 presses the integrated boss portion inwardly from the outer periphery so as to apply the surface pressure to a meshed part between the serrations for reinforcement, allowing secure mounting without backlash.

The boss body 123 also can be mounted to the steering shaft S through close contact between the inclined faces without backlash.

In such a way, the second embodiment can provide the fixed structure, as it were, of a core-bar boss portion which is likely obtained by press forming a steel plate. Specifically, formation of the boss body 123 out of a high-rigidity member allows formation of the other portion out of a relatively low-rigidity member. By way of example, as seen in the illustrative embodiment, a hollow member can be adopted having the combined upper and lower shells 121, 122 each obtained by press forming a single metal plate, resulting easy achieving of a reduction in weight and manufacturing cost.

In the event that the occupant collides with the steering wheel regardless of actuation of the airbag device, the core bar 111 can be deformed or self-aligned, absorbing a collision impact. At this time, the core bar 111 provides a greater strength, since the outer periphery of the boss core-bar portion 116 is reinforced by the junctions 136, 156, the rim core-bar portion 115 and the spoke core-bar portion 117 continuously connecting the junctions 136, 156 form a tube with closed section, and the embracement coupling structure provides a rib structure. Moreover, the spoke core-bar large-diameter portion and, as required, rim core-bar large-diameter portion having increased sectional area are formed at the outside connection to which the rim core-bar portion and the spoke core-bar portion are coupled, and the spoke core-bar large-diameter portion is shaped like a soft sector to increase the sectional area, allowing restrained concentration of a stress on the outside connection 118. This results in excellent shape conservation-ability of the steering-wheel main body in its entirety. Then, an outer peripheral edge of the boss core-bar portion 116 functions as the weakness zone X, which is deformed extensively to change the angle at the base, as it were, of the spoke core-bar portion 117 with the entire shape conserved with respect to an external force, absorbing a collision impact, resulting in easy enhancement of the impact absorbing characteristics. By way of example, the load-stroke characteristics of the core bar 111 when depressing a given point thereon reveal that the core bar 111 can provide excellent impact absorbing characteristics similar to those for the core bar of magnesium alloy, wherein a rising curve is traced in smaller stroke area, and a flat curve is traced in a larger stroke area.

Figure 10:
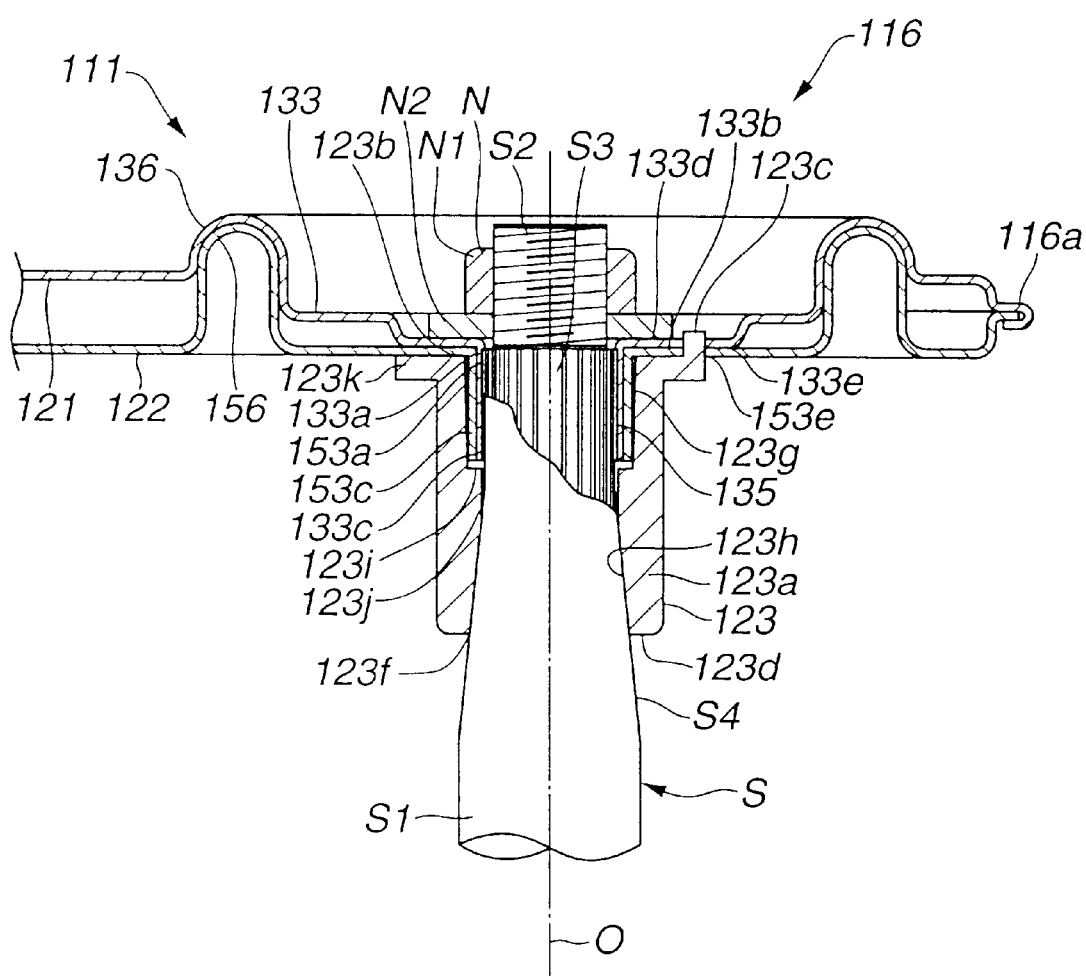
FIG. 10 is a view similar to FIG. 7, showing a third embodiment of the present invention.

The upper and lower shells 121, 122 and boss body 123 of the boss core-bar portion 116 may be of the appropriate shape. By way of example, referring to FIG. 10, the boss body 123 can include a flange 123k at the top face 123b to extend to the outer periphery. Moreover, the three pins or positioning parts 123c can be protruded from the flange 123k.

Figure 11:
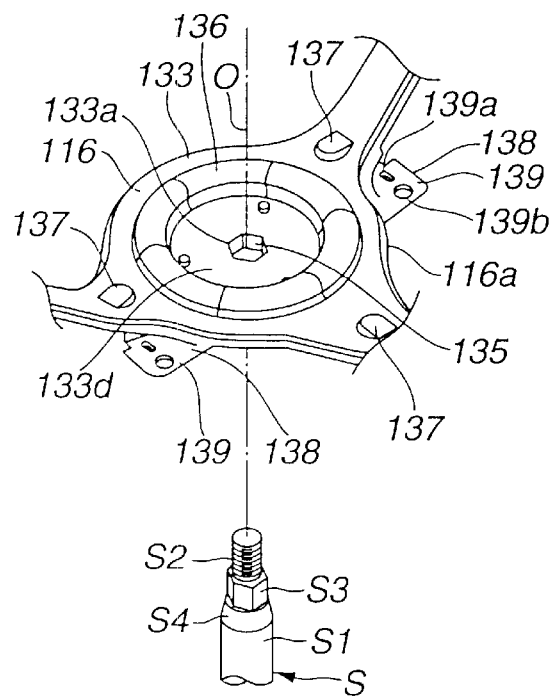
FIG. 11 is a fragmentary exploded perspective view showing a fourth embodiment of the present invention.
Figure 12:
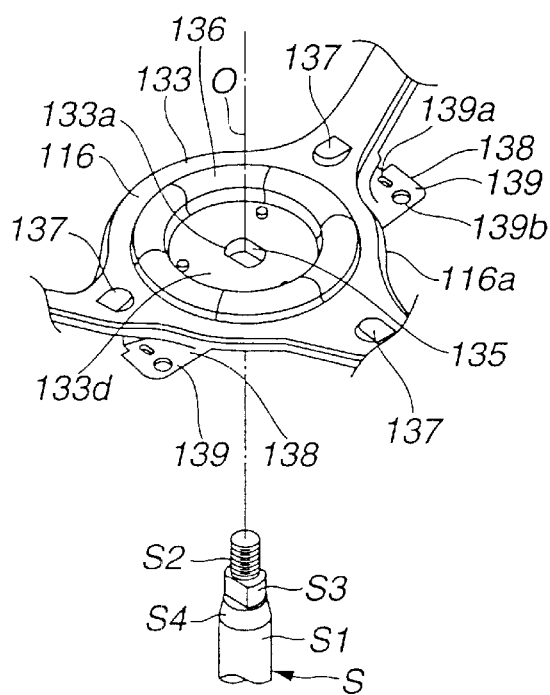
FIG. 12 is a view similar to FIG. 11, showing a fifth embodiment of the present invention.

Furthermore, the engaging mechanism for the rotation engagement S3 of the steering shaft S and the rotation reception 135 of the core bar 111 is not limited to the form of triangular grooves or serration, and can be of various forms. By way example, the engaging mechanism may be of a polygon such as hexagon as shown in FIG. 11, or of a modified shape such as partly filled circle as shown in FIG. 12.

Figure 13:
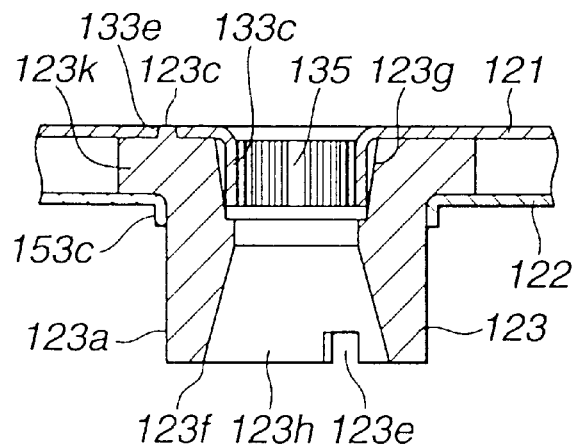
FIG. 13 is a fragmentary section showing a sixth embodiment of the present invention.

Further, instead of being mounted to the lower side of the upper and lower shells 121, 122, the boss body 123 can partly be held between the upper and lower shells 121, 122 for fixing. By way of example, referring to FIG. 13, the rotation support 123g of the boss body 123 can be engaged with the outer periphery of the tube 133c of the upper shell 121 to press the rotation reception 135 formed therewith against the inner periphery, whereas the tube 153c of the lower shell 122 can be engaged with the outer periphery of the main body 131 a of the boss body 123. With this configuration, by coupling the upper and lower shells 121, 122 with the flange 123k of the boss body 123 held therebetween, the boss body 123 can temporarily be fixed to the upper and lower shells 121, 122, enabling also an improvement in the workability.

Still further, the tightening fixation S2 of the steering shaft S and the tightening means N secured thereto also can be of various forms. By way of example, referring to FIGS. 14–15, the tightening means N may include a bolt with threaded portion N3 and head N4, and the tightening fixation S2 may include a tapped hole which opens at a head and with which the threaded portion N3 is meshed.

Figure 14:
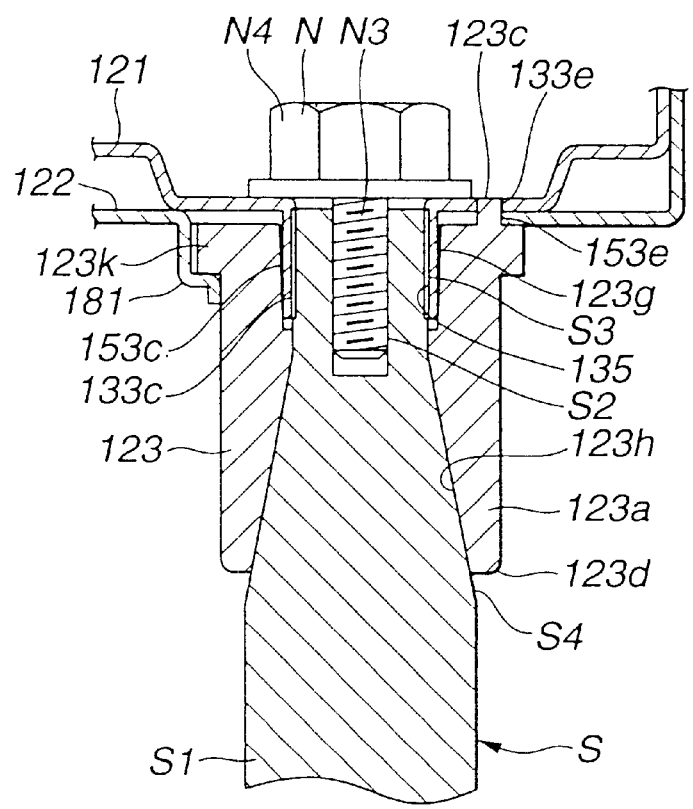
FIG. 14 is a view similar to FIG. 13, showing a seventh embodiment of the present invention.
Figure 15:
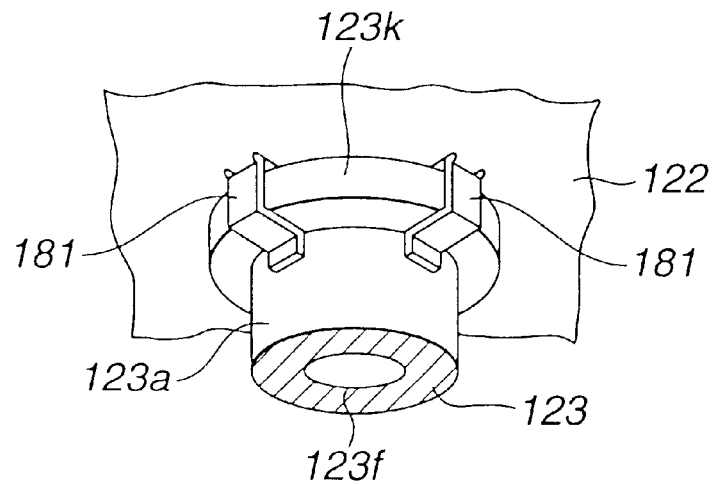
FIG. 15 is a fragmentary perspective view showing the core bar in FIG. 14.

In the embodiment as shown in FIGS. 14–15, a holder 181 integrally developed from the whole or several, e.g. three, sports of the tube 153c of the lower shell 122 serves to hold the flange 123k of the boss body 123.

Figure 16:
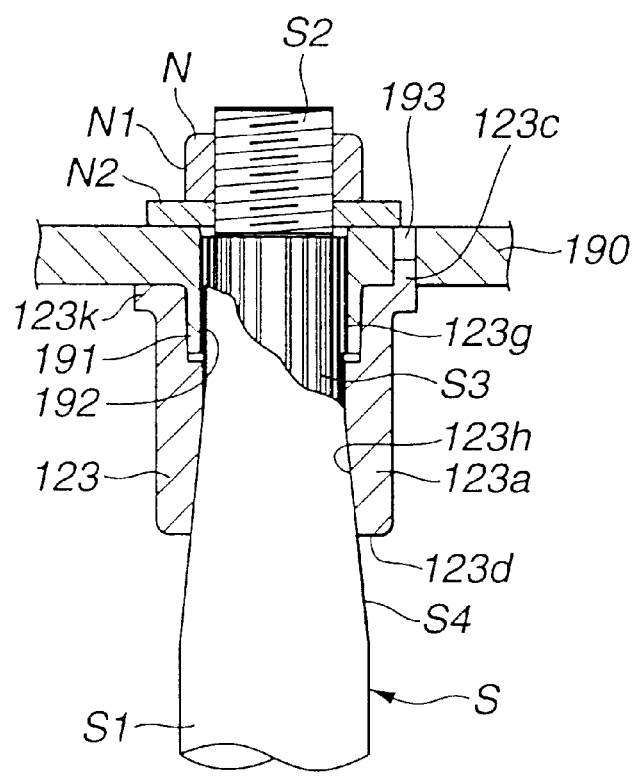
FIG. 16 is a view similar to FIG. 14, showing an eighth embodiment of the present invention.

Furthermore, the core-bar main body with which a boss body 123 is combined is not limited to a member obtained by press forming of a metal plate. Optionally, referring to FIG. 16, a core-bar main body 190 may be obtained by die casting of aluminum or magnesium alloy. With this configuration, a tube 192 of die-cast metal is integrally formed with the boss core-bar portion 116, with which a rotation reception 191, a positioning through hole or parts 193, etc. are formed.

Moreover, in the similar way to the first embodiment, the steering wheel can be constructed otherwise. By way of example, the number of spokes or spoke core-bar portions 117 may be one, two, and four or more in place of three. Furthermore, without using a preformed member, the sheath for covering the core bar 111 may be a member obtained by insert molding by injecting resin into a mold with the core bar 111 disposed therein.

The entire contents of Japanese Patent Applications 2000-073001, 2000-073000 and 2000-301026 which are the priority documents on which the above disclosure is based, are hereby incorporated by reference thereto.

What is claimed is:

1. A core bar for a steering wheel mounted to a steering shaft, comprising:
   a first half shell; and
   a second half shell coupled to the first half shell,
   each half shell comprising:
      a boss portion coupled to the steering shaft, the boss portion including a boss-edge coupling part for coupling the first and second half shells along edges thereof, and a shaft fixing part placed substantially in a center of the boss portion and mounted to the steering shaft,
      a zone of weakness defined between the boss-edge coupling part and the shaft fixing part of the boss portion, and wherein the first and second half shells face each other without being coupled;
      a rim portion including a rim-edge coupling part for coupling the first and second half shells along the edges thereof and a rim hollow part defined between the first and second half shells; and
      a spoke portion interposed between the boss portion and the rim portion, the spoke portion including a spoke-edge coupling part for coupling the first and second half shells along the edges thereof and a spoke hollow part defined between the first and second half shells, the zone of weakness being smaller along an axial direction of the steering shaft and larger in a direction perpendicular to the axial direction of the steering shaft compared with each of the rim and spoke hollow parts.

2. The core bar as claimed in claim 1, the steering shaft being provided with a fixation part to which a tightening means is tightened in a predetermined axial direction, an engagement part engaging in a direction of rotation, and a tapered part tapering in an opposite axial direction to the predetermined axial direction, wherein the shaft fixing part of the boss portion comprises a first reception engaged with the fixation part of the steering shaft and a second reception engaged with the engagement part of the steering shaft.

3. The core bar as claimed in claim 2, wherein the shaft fixing part further comprises a third reception engaged with the tapered part of the steering shaft and pressed in the opposite axial direction and a support pressing the second reception of the shaft fixing part against the engagement part of the steering shaft.

4. The core bar as claimed in claim 3, wherein the boss portion comprises a base with the first reception and a tube protruded from the base and with the second reception at the inner periphery.

5. The core bar as claimed in claim 4, wherein the support of the shaft fixing part is engaged with an outer periphery of the tube of the boss portion.

6. The core bar as claimed in claim 1, wherein the rim portion comprises, in the vicinity of a connection to the spoke portion, a part with greater section than that of an adjacent part.

7. The core bar as claimed in claim 1, wherein the spoke portion comprises, in the vicinity of a connection to the rim portion, a part with greater section than that of an adjacent part.

8. The core bar as claimed in claim 1, wherein at least one of the rim and spoke portions is of a section increasing to a connection between the rim and spoke portions.

9. The core bar as claimed in claim 1, wherein the shaft fixing part of the boss portion comprises a boss body held between the first and second half shells and including a boss flange fixed to at least one of the first and second half shells.

10. The core bar as claimed in claim 1, wherein the boss-edge coupling part, the rim-edge coupling part, and the spoke-edge coupling part comprise a flange arranged along one of the edges of the first and second half shells and an embracement arranged along another of the edges for holding the flange, respectively.

11. The core bar as claimed in claim 1, wherein the boss portion comprises a circular reinforcement surrounding the shaft fixing part and the zone of weakness.

12. A core bar for a steering wheel mounted to a steering shaft, comprising:
    a first half shell; and
    a second half shell coupled to the first half shell, each half shell comprising a boss portion, a rim portion and a spoke portion, the boss portion comprising a boss-edge coupling part for coupling the first and second half shells along edges thereof, a shaft fixing part placed substantially in a center of the boss portion and mounted to the steering shaft and a zone of weakness defined between the boss-edge coupling part and the shaft fixing part and wherein the first and second half shells face each other without being coupled, the rim and spoke portions comprising a flange arranged along one of the edges of the first and second half shells, an embracement arranged along another of the edges for holding the flange, and a hollow defined between the first and second half shells, respectively, the spoke portion comprising, in the vicinity of a connection to the rim portion, a part with greater section than that of an adjacent part.

13. The core bar as claimed in claim 12, wherein the rim portion comprises, in the vicinity of a connection to the spoke portion, a part with greater section than that of an adjacent part.

14. The core bar as claimed in claim 12, wherein at least one of the rim and spoke portions is of a section increasing to a connection between the rim and spoke portions.

* * * * *